United States Patent [19]
Mann

[11] 3,958,786
[45] May 25, 1976

[54] STAND FOR MUSICAL INSTRUMENTS

[76] Inventor: Gary A. Mann, 3212 James St., Fort Worth, Tex. 76110

[22] Filed: Nov. 27, 1974

[21] Appl. No.: 527,660

[52] U.S. Cl. ................................ 248/176; 84/327; 84/453; 211/195
[51] Int. Cl.² ........................................ F16M 11/00
[58] Field of Search .......... 248/176, 166, 460, 461, 248/462, 463, 464, 465, 454; 211/13, 178; 84/327, 329, 453; 280/79.2, 79.3, 47.37

[56] References Cited
UNITED STATES PATENTS

| | | | |
|---|---|---|---|
| 1,272,583 | 7/1918 | Vrubel | 84/327 |
| 1,464,279 | 8/1923 | Hindley | 84/453 |
| 1,684,912 | 9/1928 | Dunklau | 211/13 |
| 3,168,329 | 8/1963 | Goldschmidt | 211/178 R |
| 3,507,402 | 4/1970 | Barbee | 280/35 |
| 3,540,752 | 11/1970 | Anuskiewicz | 280/35 |

Primary Examiner—Roy D. Frazier
Assistant Examiner—Robert A. Hafer
Attorney, Agent, or Firm—James C. Fails

[57] ABSTRACT

A portable stand for being emplaced on the floor and supporting musical instruments and the like characterized by a base, preferably that includes a plurality of foldable pieces that can be extended to define a peripheral support, with a planar top to avoid entangling with cords of musical instruments and that is pivotally movable into a folded position for carrying; an extensible main support member that includes a plurality of lineal members foldable into the folded position and slidable longitudinally with respect to each other and movable into a supporting position with a retainer for retaining a set support position. A brace and latch are provided for latching the main support member into a predetermined supporting position. Instrument supports are carried, respectively, by the base and the main support member and are movable to support instruments as small as a ukulele, yet accommodate the largest guitar. Also disclosed are specific structural details of the preferred embodiment.

8 Claims, 3 Drawing Figures

STAND FOR MUSICAL INSTRUMENTS

BACKGROUND OF THE INVENTION

1. Field of the Invention

This invention relates to a collapsible stand particularly adapted to supporting musical instruments, such as banjos, guitars and the like, during rest periods or when the instrument is not in use.

2. Description of the Prior Art

The prior art has seen a variety of collapsible stands for supporting musical instruments or the like, such as illustrated in U.S. Pat. No. 1,684,912. These stands have ordinarily included tripod type legs. While such tripod stands were satisfactory when invented back in 1904, 1928 and the like, the instruments then in use did not have cords to amplifiers and the like. Today, on stage, the musician is surrounded by guitar cords, microphone cords, amplifier cords, speaker cords and the like. Consequently, as the musician moves about the stage, his instrument drags the cords and the cords become entangled in the legs of the tripod stands and overturn them.

Moreover, with increased electronic equipment having to be carried, it is increasingly vital that the portable stand fold into ever smaller sized packages in the folded position for transport.

Yet, the variety of instruments continuously increase and the flexibility of the stand must be greater for today's entertainer. For example, the stand must accommodate a small ukulele, yet be extensible to accommodate the largest guitar or the like. These limitations impose severe constraints on a satisfactory stand, and no completely satisfactory stand has been available before this invention.

Moreover, it is desirable that, when the sections and members of the stand be unfolded, they be tightenable into position to retain a set position, without becoming loosened from spring tension or the like.

SUMMARY OF THE INVENTION

Accordingly, it is an object of this invention to provide a stand for a musical instrument or the like that is small in the folded position, lightweight, and readily transportable; yet, extensible to accommodate any size musical instrument and obviate the disadvantages of the prior art.

Specifically, it is an object of this invention to provide a small portable stand that can be unfolded into a supporting position to accommodate any size musical instrument requiring such a stand, yet provide a base that does not become entangled in the cords as did the prior art stands.

These and other objects will become apparent from the descriptive matter hereinafter, particularly when taken in conjunction with the appended drawings.

The objects of this invention are effected by a portable stand for being emplaced on a floor and supporting a musical instrument or the like and comprising a base that has a substantially planar top; a main support member that is extensible for positioning an instrument engaging member at a desired height; bracing and latching means for latching the main support member into a set supporting position and lower instrument supports carried by the base. Preferably, the base includes a plurality of pieces that are pivotally connected together; that, in an unfolded position, define peripheral support with a top that lies in a top plane that is substantially parallel with and close to the floor so as to avoid entangling cords of musical instruments and the like. The pieces of the base are pivotally movable into a folded position of dimensions less than the peripheral support in at least one direction. The base includes locking means for locking the pieces into the unfolded position. The extensible main support member has a plurality of lineal members that are movable longitudinally with respect to each other, one of the members being pivotally carried by the base and the other of the members carrying near its uppermost end the instrument engaging member. The extensible main supporting member also has retainer means for retaining the lineal members extended at a preset supporting position.

DESCRIPTION OF PREFERRED EMBODIMENT(S)

Figure 1:
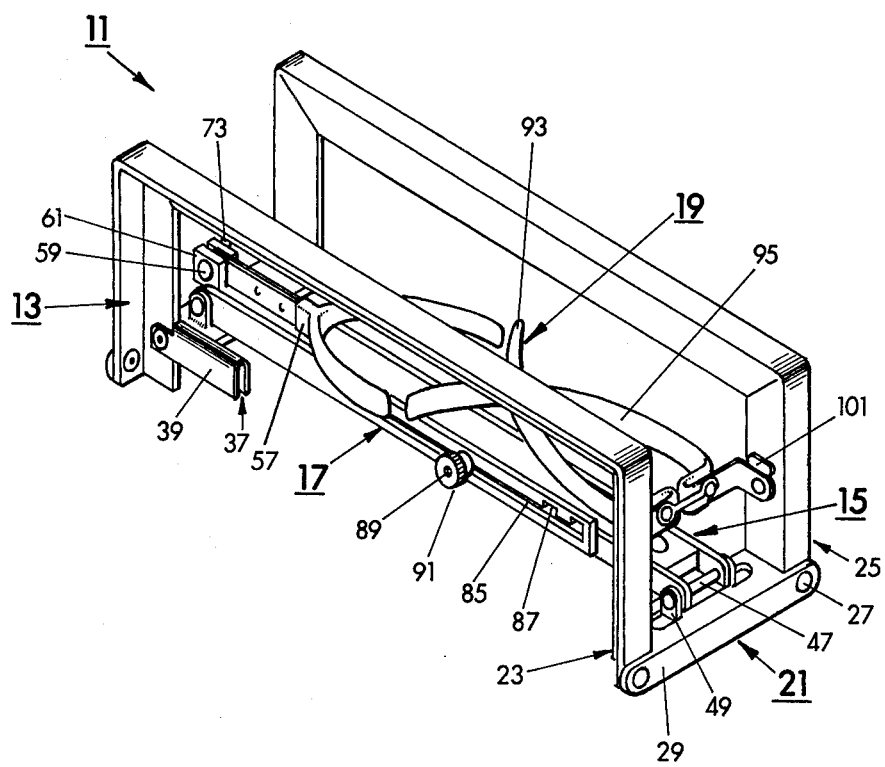
FIG. 1 is an isometric view of one embodiment of this invention in the folded position.
Figures 2, 3:
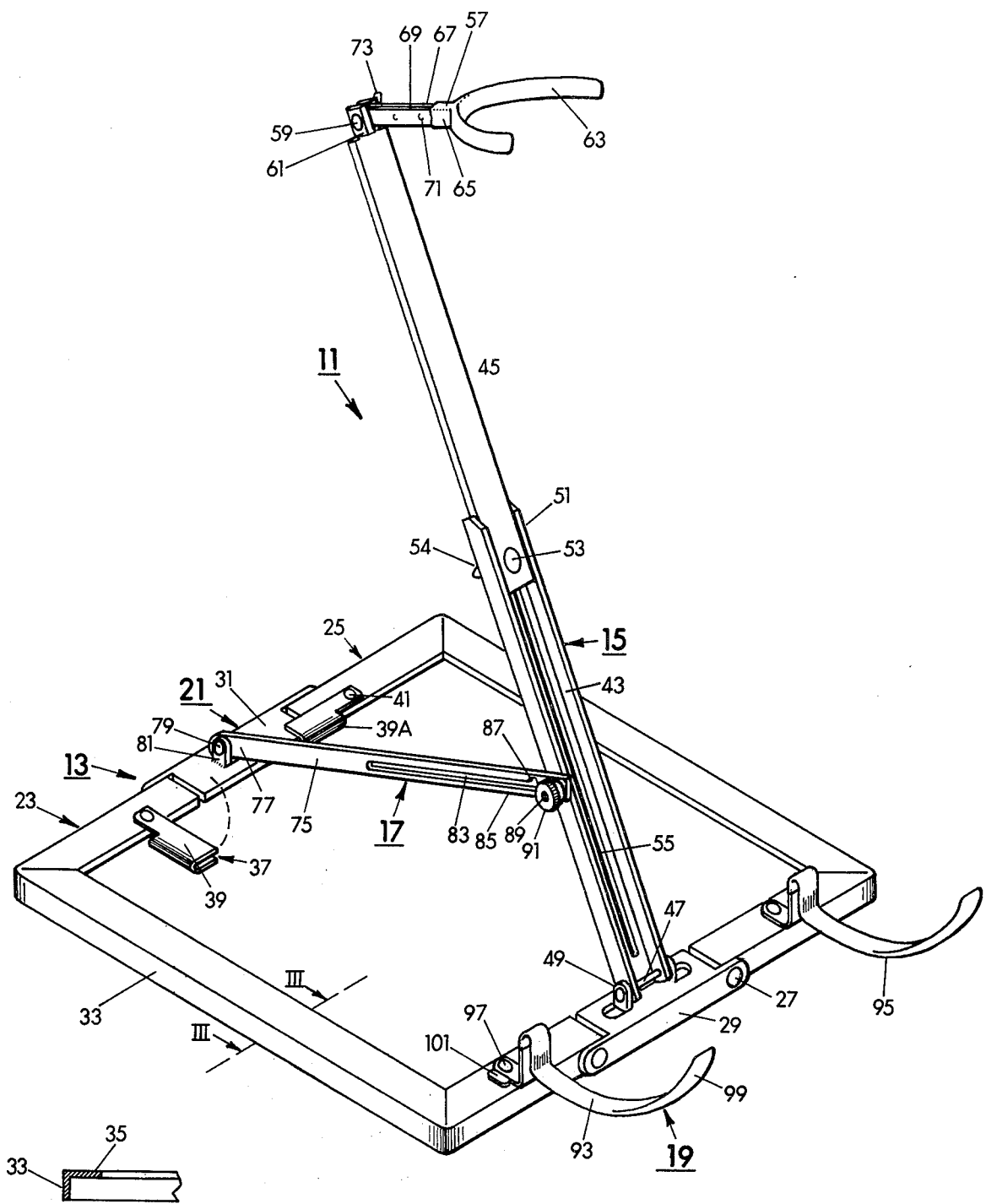
FIG. 2 is an isometric view of the embodiment of FIG. 1 unfolded into a supporting position.
FIG. 3 is a cross sectional view of a peripheral member of the base taken along the line III—III of FIG. 2.

Referring to FIGS. 1 and 2, the stand 11 includes a multiple piece base 13, extensible main support member 15, bracing and latching means 17 and instrument supports 19.

The base 13 includes a plurality of pieces that are pivotally connected together. The pieces define peripheral support in an unfolded position such as illustrated in FIG. 2. The peripheral support has a top that lies in a top plane that is closely and substantially parallel with the floor on which the base 13 sits so as to avoid entangling with cords of musical instruments, amplifiers and the like. The pieces are pivotally movable into a folded position such as illustrated in FIG. 1. Specifically, the base 13 includes a center section 21 with two sections 23 and 25 pivotally connected with the center section, as by brads 27. If desired, any equivalent means, such as bolts and nuts, may be employed herein to provide the pivot shafts, rather than brads. The section 23 is pivotally movable to extend laterally in one direction from the center section 21. The other section 25 is pivotally movable to extend laterally in the opposite direction from the center section 21 in the unfolded position, as illustrated in FIG. 2. As illustrated in FIG. 1, the two sections 23 and 25 are pivotally movable into a position substantially perpendicular to the center section 21 for transport.

The center section 21 comprises two members 29 and 31, as illustrated, for light weight; rather than having a continuous member traversing completely across the base. A solid deck structure is feasible for center section 21, but increases the weight of the stand. As illustrated, the members 29 and 31 are angle members, or L-shaped in cross section; similarly as described hereinafter with respect to the members 23 and 25. The laterally extending portion, or top, of the L-shaped members 29 and 31 are foreshortened in order to accommodate the members 23 and 25 when folded into the vertical position in the folded position.

The two sections 23 and 25 are also formed of angle material of L-shaped cross section, similarly as illustrated in FIG. 3. Therein, the L-shaped member 33 is shown in section. The respective ends and side member of the peripheral members 33 of the pieces 23 and 25 may be welded together or may have a vee cut out and bent into the desired shape, or otherwise stamped into shape depending upon the economics of manufacture. As can be seen, the L-shaped members have respective planar edges 35. The planar edges of the respective members of the base define the top plane. Since they are co-planar, they are readily locked into a unitary configuration by locking means 37. Specifically, the locking means 37 includes U-shaped clips 39 that are pivotally mounted, as by brads 41, on one piece of the base and are pivotally movable to encompass at least two adjacent planar edges 35 adjacent the respect pivotal connections, such as brads 27. As illustrated in FIG. 2, the clip 39A has been moved into locking position to lock the section 25 into unitary configuration with the center section 21.

If desired, weights may be included adjacent the peripheral portions of the members 29, 31 or 33 to increase the stability of the base. Ordinarily, this needlessly increases the weight, since the stand is suitably stable without such weights. Moreover, the respective locking means 37 can be included on both sides of the base and lock both the members 29 and 31 into unitary configuration with the side sections 23 and 25. This has not been found necessary to date, since adequate support is given the main support member 15 with only the member 31 being locked into unitary configuration.

The main support member 15 includes at least a first lineal member 43 and a second lineal member 45 in order to be extensible to various heights to support various musical instruments. The first lineal member 43 is pivotally carried by one of the pieces, such as member 29, of the base 11 so as to be movable into an upright position for supporting the instrument, as illustrated in FIG. 2; and into a folded position substantially parallel with the top plane of the base, as illustrated in FIG. 1. Specifically, a fulcrum shaft 47 penetrates laterally through apertures in the first lineal member 43 and is supported in mounting brackets 49. As illustrated, the mounting brackets 49 are stamped from the planar top portion of the piece 29. The fulcrum shaft 47 may comprise a bolt with a nut on the end or an elongate brad.

As illustrated, the first member 43 has U-shaped cross section for slidably retaining the second member 45. The illustrated second member 45 is a substantially planar member that slidably engages the U-shape of the first lineal member 43. A retainer means 51 is provided for retaining the first and second lineal members 43 and 45 in any set supporting position. As illustrated, the retainer means 51 includes a bolt 53 having a hand tightenable nut, such as wing nut 54, or a knurled nut, on the opposite side to hold a set supporting position. The bolt 53 has a square base such that it does not turn when the wing nut 54 is tightened into position. The retainer means includes a slot 55 penetrating longitudinally of the first lineal member 43 to accommodate longitudinal movement of the bolt 53 with the second lineal member 45. If desired, the bolt-slot disposition in the lineal members can be reversed, as long as the same extensible arrangement is effected. By the extensible arrangement, the main supporting member can be as short as about 10 inches to accommodate a ukulele or the like, or extended to the 36 inches or more so as to accommodate the largest guitar.

As illustrated, the second lineal member 45 serves as the uppermost lineal member and pivotally carries an instrument engaging member 57 adjacent its uppermost end in the unfolded, or supporting, position. Specifically, the instrument engaging member is pivotally mounted, as by brad 59, in a mounting bracket 61 that extends perpendicularly from the planar surface of the second lineal member 45 to enable folding the instrument engaging member 57 into its folded position as illustrated in FIG. 1.

If desired, a third lineal member may be maintained in sliding engagement with the second lineal member 45 for still further flexibility. In such an event, the mounting bracket 61 and the brad, or fulcrum shaft, 59 would maintain the instrument engaging member 57 adjacent the uppermost end of the third lineal member. Preferably, the fulcrum shaft 59 includes a tightenable means, such as wing nut 73 for retaining a set supporting position, although spring or detent means may be employed for retaining a supporting position of the instrument engaging member 57.

As illustrated, the instrument engaging member 57 includes a bifurcated member 63 with a resilient covering 65, as of thermoplastic material, rubber, or the like. Specifically, the illustrated resilient covering was formed by dipping in molten plastic. The instrument engaging member 57 has a piece 67 that is retained in fixed engagement with another piece 69 as by brads 71. If desired, of course, it may be formed as a unitary structure as by being molded or stamped from plastic, metal or the like. The bolt 53 and hand tightenable wing nut 54 enable tightening the main support member 15 at a predetermined length commensurate with the predetermined supporting position effected by the latching and bracing means 17.

The latching and bracing means 17 includes an elongate brace 75 pivotally mounted at its base end 77. Specifically, the base end 77 is pivotally mounted on a fulcrum shaft 79, such as a brad or bolt and nut combination, in mounting brackets 81 on the base 13. As illustrated, the brace 75 is a linear member, although arcuate members may be employed if desired. The brace 81 has a slot 83 traversing longitudinally thereof adjacent its free end 85. The slot 83 has a plurality of recesses 87 at predetermined locations for effecting most used respective predetermined supporting positions of the main support member 15. The bracing and latching means also includes a threaded shaft 89 that is fixedly connected with the first lineal member 43 and extends through the slot 83. A hand tightenable nut, such as knurled nut 91, is screwed onto the threaded shaft for tightening the brace 75 and the first lineal member 43 into respective supporting positions. When the knurled nut is loosened, the brace 75 and the first lineal member 43 may be moved into the folded position, such as illustrated in FIG. 1. Thus, when fastened in a supporting position, the stand supports an instrument on the instrument supports 19 in the proper attitude.

The instrument supports 19 include a plurality of arcuate members 93 and 95 that are pivotally mounted, as by brad 97, on the respective sections 23 and 25. The arcuate members 93 and 95 are pivotal into the unfolded position extending laterally exteriorly of the base, as illustrated in FIG. 2, for supporting an instrument; and are pivotal into a folded position, as illustrated in FIG. 1, interiorly of the base 13. As illustrated, the arcuate members 93 and 95 have a resilient covering material 99 such as thermoplastic, rubber, or the like to prevent damaging the finish of the instruments. If the arcuate members 93 and 95 are formed of thermoplastic material, the covering is not necessary. Protrusions 101 constrain the members 93 and 95 such that they will not pivot through 360° but will retain a position supporting the instrument when moved thereinto. Because of protrusions 101, the members 93 and 95 are pivoted interiorly after the sections 23 and 25 are pivoted oppositely from their folded position an amount at least sufficient for the members 93 and 95 to clear the other components.

In operation, the stand 11 is carried to the stage in the folded position, illustrated in FIG. 1. The side sections 23 and 25 are unfolded more than 90° and sufficiently for unfolding members 93 and 95. Members 93 and 95 are pivoted outwardly for supporting the instrument(s) or the like. The side sections 23 and 25 are pivoted back to become co-planar with the center section 21. The U-shaped clips are pivoted into position encompassing the planar edges 35 to lock the base into a co-planar structure that will not entangle with the cords of the musical instruments or the like. The knurled knob 91 is loosened and the first lineal member 43 pivoted upwardly into its desired supporting position. The knurled knob 91 is tightened to retain the main support member 15 in the attained supporting position. The wing nut 54 on the bolt 53 is loosened and the second lineal member is extended to the predetermined height for the predetermined supporting position for supporting the instrument. Thereafter, the wing nut 54 is tightened to retain the supporting position. The instrument engaging member 57 is pivoted into position for receiving the neck of the instrument. As illustrated, it is moved outwardly into a substantially perpendicular position with respect to the second lineal member 45 such that the bifurcated section will receive the neck of a guitar or the like. Protrusions 101 ensure that the members support the instrument, as indicated hereinbefore.

In a supporting position, there are no tripod legs to become entangled in the cord such that the stand can be readily tipped over. On the contrary, the cords slide across the low, substantially planar base top without knocking over the stand. Even when the cords engage the brace 75, they slide up the brace without knocking the stand over because the center of pressure of contact with the cord is low relative to the width of the base.

When the performance is finished, the operations delineated hereinbefore are reversed such that the stand can be moved into the folded position depicted in FIG. 1.

The materials of construction may be those conventional to this art. Plastic, such as thermosetting or thermoplastic materials may be employed for some of the components. It is ordinarily advantageous to employ metal components that can be readily stamped, bradded and the like for inexpensive production. Suitable metals include steel as well as the lightweight metals, such as aluminum and magnesium. The covering materials may comprise felt or other cloth-like fabrics, in addition to the delineated thermoplastic or rubber.

Moreover, if desired, the bottom of the members 29, 31 and 33, of the base 13 may be covered with felt or the like to prevent marring surfaces. Ordinarily, this is unnecessary, since the stages do not have floors that are readily marred.

The base 13 may comprise a unitary member, instead of the multiple piece member if desired, as long as it has the low structure to avoid entangling with the cords. By "substantially parallel" is meant making an angle of less than 30° with respect thereto.

While only two recesses have been illustrated in the brace 75, since that has been found to be adequate, any given number may be employed as desired.

The base may be made in any suitable dimensions and shapes — circular, rectangular, or square. For example, square bases of from 10 to 18 inches in lateral dimensions in the unfolded position have been found satisfactory.

This stand was designed with the musician in mind from personal experiences. This stand with its substantially planar base is extraordinarily stable. Moreover, the base and main support member are manually latched into a set supporting position and will not collapse even if moved across the floor of a stage; for example, being dragged by a cord or being kicked or tripped over. In contrast, the conventional tripod stands tend to fall. The economical tripod stands tend to collapse; whereas more expensive tripod stands tend to dig in and overturn.

From the foregoing, it can be seen that this invention accomplishes the objects delineated hereinbefore and provides a very satisfactory and extraordinarily stable stand for an instrument or the like that resists being tipped over by entanglement with cords and the like.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A portable stand for being emplaced on a floor and supporting musical instruments and the like comprising:
   a. a base that includes a substantially planar top for being emplaced closely adjacent said floor so as to avoid entangling cords of musical instruments; said base including:
      i. a plurality of pieces that are pivotally connected together; that, in an unfolded position, define peripheral support for said substantially planar top; and that are pivotally movable into a folded position of dimension less than said peripheral support in at least one direction; the peripherally outermost pieces being foldable into a substantially vertical plane; and
      ii. locking means for locking said pieces into said unfolded position;
   b. an extensible main support member that includes:
      i. a plurality of at least first and second lineal members; said first lineal member being pivotally carried by said base and movable into an upright position for supporting said instrument and into a folded position substantially parallel with said top; said at least second lineal member being slidably movable longitudinally of said first lineal member for extension of the uppermost lineal member to a predetermined height in a supporting position;
      ii. an instrument engaging member for supporting said instrument; said instrument engaging member being pivotally carried by said uppermost lineal member of said main support member adjacent the upper end thereof in said supporting position and foldable into said folded position for transport; and
iii. retainer means for retaining said lineal members extended in said supporting position; said retainer means being manually operable into and out of retaining engagement with said lineal members;

c. bracing and latching means for latching said main support member into a predetermined supporting position; said bracing and latching means including a plurality of predetermined latching locations for a plurality of said supporting positions at respective different angles relative to said base for supporting different said instruments; said bracing and latching means being pivotally mounted on said base and pivotally connected with said main support member; said bracing and latching means having means for clamping said base and said main support member into said set supporting position that will not collapse even if dragged across said floor by cords and the like; and d. lower instrument support carried by said base for supporting said instrument said lower instrument support including a plurality of arcuate members, one each being pivotally mounted respectively on one each of two sections of said base; said arcuate members being pivotally movable into an unfolded position extending laterally exteriorly of said base for supporting said instrument and into a folded position interiorly of said base for transport; said lower instrument support also including means for preventing spreading of said arcuate members too far to support said instrument when they are moved into said unfolded position.

2. A portable stand for being emplaced on a floor and supporting musical instruments and the like comprising:
a. a base that includes a substantially planar top for being emplaced closely adjacent said floor so as to avoid entangling cords of musical instruments; said base including:
i. a plurality of pieces that are pivotally connected together; that, in an unfolded position, define a peripheral support for said substantially planar top; and that are pivotally movable into a folded position of dimension less than the peripheral support in at least one direction; said pieces of said base including planar edge portions; and
ii. locking means for locking said pieces into said unfolded position; said locking means including U-shaped clips that are pivotally carried by one piece of said base and pivotally movable to encompass at least two adjacent planar edge portions of respective pieces adjacent a pivot connection therebetween and thereby lock said pieces into a unitary configuration in defining said peripheral support;
b. an extensible main support member that includes:
i. a plurality of at least first and second lineal members; said first lineal member being pivotally carried by said base and movable into an upright position for supporting said instrument and into a folded position substantially parallel with said top; said at least second lineal member being slidably movable longitudinally of said first lineal member for extension of the uppermost lineal member to a predetermined height in a supporting position;
ii. an instrument engaging member for supporting said instrument; said instrument engaging member being pivotally carried by said uppermost lineal member of said main support member adjacent the upper end thereof in said supporting position and foldable into said folded position for transport; and
iii. retainer means for retaining said lineal members extended in said supporting position; said retainer means being manually operable into and out of retaining engagement with said lineal members;
c. bracing and latching means for latching said main support member into a predetermined supporting position; said bracing and latching means including a plurality of predetermined latching locations for a plurality of said supporting positions for supporting different said instruments; said bracing and latching means being pivotally mounted on said base and pivotally connected with said main support member; said bracing and latching means having means for clamping said base and said main support member into said set supporting position that will not collapse even if dragged across said floor by cords and the like; and
d. lower instrument support carried by said base for supporting said instrument.

3. The stand of claim 2 wherein said base includes a center section and two sections pivotally connected with said center section; a first one of said two sections extending laterally in one direction from said center section in said unfolded position, and a second one of said two sections extending laterally in another direction from said center section in said unfolded position.

4. The stand of claim 3 wherein said center section includes two pieces, one on each side for light weight.

5. The stand of claim 4 wherein said two sections comprise peripheral members for light weight; said base is substantially square in said unfolded position; and said two peripheral members fold into said folded position perpendicular to said two pieces of said center section.

6. The stand of claim 3 wherein said first lineal member of said main support and said bracing and latching means are pivotally mounted on said center section of said base.

7. The stand of claim 3 wherein said lower instrument supports include a plurality of arcuate members, one each being pivotally mounted respectively on one each of said two sections of said base; said arcuate members being pivotally movable into said unfolded position extending laterally exteriorly of said base for supporting said instrument and into a folded position interiorly of said base for transport; and means for preventing spreading of said arcuate members too far to support said instrument.

8. The stand of claim 3 wherein said bracing and latching means includes an elongate brace pivotally mounted via a base end on said base and having a slot traversing longitudinally adjacent its other end; said slot having a plurality of recesses at predetermined locations; a threaded shaft fixedly connected with said first lineal member of said main support member and extending through said slot; and a hand tightenable nut screwed onto said threaded shaft for tightening said brace and said first lineal member into respective supporting positions and loosenable for moving into said folded position.

* * * * *